(12) United States Patent
Larimer et al.

(10) Patent No.: US 10,636,102 B1
(45) Date of Patent: Apr. 28, 2020

(54) BIDDING ON A POST IN A SOCIAL MEDIA PLATFORM

(71) Applicant: block.one, Grand Cayman (KY)

(72) Inventors: Daniel J. Larimer, Christianburg, VA (US); Richard B. Whitner, Blacksburg, VA (US); Leonardo Lima Ribeiro, Blacksburg, VA (US)

(73) Assignee: block.one, Grand Cayman (KY)

( * ) Notice: Subject to any disclaimer, the term of this patent is extended or adjusted under 35 U.S.C. 154(b) by 0 days.

(21) Appl. No.: 16/428,574

(22) Filed: May 31, 2019

(51) Int. Cl.
*G06Q 30/00* (2012.01)
*G06Q 50/00* (2012.01)
*G06Q 20/06* (2012.01)
*G06Q 30/08* (2012.01)
*G06Q 30/06* (2012.01)

(52) U.S. Cl.
CPC ........... *G06Q 50/01* (2013.01); *G06Q 20/065* (2013.01); *G06Q 30/0613* (2013.01); *G06Q 30/08* (2013.01); *H04L 2209/38* (2013.01); *H04L 2209/466* (2013.01); *H04L 2209/56* (2013.01)

(58) Field of Classification Search
CPC ..... G06Q 30/0241–0277; G06Q 30/06; G06Q 30/0601–0643; G06Q 30/08; G06Q 50/01; G06Q 2220/00–18
See application file for complete search history.

(56) References Cited

U.S. PATENT DOCUMENTS

| 2007/0032286 | A1* | 2/2007 | Muir | G07F 17/32 463/16 |
| 2007/0124229 | A1* | 5/2007 | Ku | G06Q 30/08 705/37 |
| 2009/0265257 | A1* | 10/2009 | Klinger | G06Q 30/02 705/26.1 |
| 2011/0072116 | A1* | 3/2011 | Kordun | G06F 16/958 709/219 |
| 2012/0158499 | A1* | 6/2012 | Banadaki | G06Q 30/0254 705/14.52 |
| 2014/0278942 | A1* | 9/2014 | Buffamanti | G06Q 50/01 705/14.45 |

(Continued)

OTHER PUBLICATIONS

Twitch Introduces 'Cheering' emotes for tipping streamers. Engadget. Aaron Souppouris. Jun. 27, 2016. (Year: 2016).*

(Continued)

*Primary Examiner* — William J Allen
(74) *Attorney, Agent, or Firm* — McDermott Will & Emery LLP (57) ABSTRACT

Systems and methods for bidding on a post in a social media platform are provided. The method includes displaying the post in a public forum of the social media platform, the post comprising original content created by an author, the post authenticated for authenticity through a blockchain. The method also includes receiving bids from users on the post, the bids comprising credits of the users. The method also includes determining a highest bid from a highest bidder of the users. The method also includes distributing the credits that were bid to the users who were outbid and to the author. The method also includes displaying the highest bidder in a top spot in relation to the post, the top spot prevalently displaying a profile associated with the highest bidder, the profile comprising a link to content of the highest bidder.

17 Claims, 4 Drawing Sheets

(56) References Cited

U.S. PATENT DOCUMENTS

| | | | |
|---|---|---|---|
| 2015/0087407 A1* | 3/2015 | Hate | G07F 17/3255 463/25 |
| 2015/0332224 A1 | 11/2015 | Melika et al. | |
| 2016/0057092 A1* | 2/2016 | Liao | H04L 51/32 709/206 |
| 2017/0031874 A1 | 2/2017 | Boudville | |
| 2017/0091397 A1 | 3/2017 | Shah | |
| 2017/0236094 A1 | 8/2017 | Shah | |
| 2017/0353311 A1 | 12/2017 | Schukai et al. | |
| 2018/0006990 A1 | 1/2018 | Munemann | |
| 2018/0025366 A1* | 1/2018 | Perriman | G06Q 30/0202 705/5 |
| 2018/0068091 A1 | 3/2018 | Gaidar et al. | |
| 2018/0114063 A1 | 4/2018 | Wexler et al. | |
| 2018/0158347 A1 | 6/2018 | Sarafzade et al. | |
| 2018/0293670 A1 | 10/2018 | Yin | |
| 2018/0336599 A1* | 11/2018 | Llewelyn | G06Q 30/0275 |
| 2018/0349478 A1 | 12/2018 | Carlisle et al. | |
| 2018/0359089 A1 | 12/2018 | Innes et al. | |
| 2018/0374097 A1 | 12/2018 | Hanna | |
| 2019/0019208 A1 | 1/2019 | Postrel | |
| 2019/0158274 A1* | 5/2019 | Tormasov | H04L 9/0637 |
| 2019/0164140 A1* | 5/2019 | Pasupula | G06Q 20/123 |
| 2019/0179509 A1* | 6/2019 | Daie | G06F 3/04815 |
| 2019/0205873 A1* | 7/2019 | Kamalsky | H04L 9/3297 |

OTHER PUBLICATIONS

Earn Rewards for supporting your favorite creators (Updated). Justin Oh. Feb. 13, 2018. https://blog.twitch.tv/earn-new-rewards-for-supporting-your-favorite-creators-da6b34a98827 (Year: 2018).*

Introducing Cheering: Celebrate, together. Robin Fontaine. Jun. 27, 2016. https://blog.twitch.tv/introducing-cheering-celebrate-together-da62af41fac6 (Year: 2016).*

Cheering and Bits—Follow Up FAQ. Bobby Scarnewman. Jun. 28, 2016. http://blog.twitch.tv/cheering-and-bits-follow-up-faq-329e676c4572 (Year: 2016).*

* cited by examiner

BIDDING ON A POST IN A SOCIAL MEDIA PLATFORM

TECHNICAL FIELD

The present disclosure generally relates to social media, and more specifically relates to bidding on posts in a social media platform.

BACKGROUND

Social media platforms provide the ability to interact with a wide variety of users online. Users may create and reply to posts in an open forum and receive feedback, such as in the form of upvotes, comments, likes, etc. Conventionally, receiving positive feedback results in an improved status of the user and more prominence to the user's profile. Similarly, a user that gives feedback to other users receives some exposure with each given feedback.

SUMMARY

The present disclosure provides for systems and methods for bidding on a post in a social media platform. According to one embodiment of the present disclosure, a computer-implemented method for bidding on a post in a social media platform is provided. The method includes displaying the post in a public forum of the social media platform, the post comprising original content created by an author, the post authenticated for authenticity through a blockchain. The method also includes receiving bids from users on the post, the bids comprising credits of the users. The method also includes determining a highest bid from a highest bidder of the users. The method also includes distributing the credits that were bid to the users who were outbid and to the author. The method also includes displaying the highest bidder in a top spot in relation to the post, the top spot prevalently displaying a profile associated with the highest bidder, the profile comprising a link to content of the highest bidder.

According to one embodiment of the present disclosure, a system is provided that includes means for storing instructions, and means for executing the stored instructions that, when executed by the means, cause the means to perform a method for incentivizing verification of a digital identity. The method includes generating a first digital identity through at least a first certified device, the first digital identity including a first secure digital artifact uploaded to an auditable chain of a public ledger to establish a first physical identity of a first user. The method also includes associating the first digital identity with a new digital identity, the new digital identity including a new secure digital artifact uploaded to the auditable chain of the public ledger to establish a second physical identity of a second user, the first digital identity providing verification for the new digital identity. The method also includes providing rewards to the first user for associating the first digital identity with the new digital identity, the rewards including social and/or monetary incentives for associating the first digital identity with the new digital identity.

According to one embodiment of the present disclosure, a system is provided for incentivizing verification of a digital identity including a memory storing sequences of instructions, and a processor configured to execute the sequences of instructions, which when executed, causes the processor to perform generating a first digital identity through at least a first certified device, the first digital identity including a first secure digital artifact uploaded to an auditable chain of a public ledger to establish a first physical identity of a first user. The execution of the sequences of instructions also causes the processor to perform associating the first digital identity with a new digital identity, the new digital identity including a new secure digital artifact uploaded to the auditable chain of the public ledger to establish a second physical identity of a second user, the first digital identity providing verification for the new digital identity. The execution of the sequences of instructions also causes the processor to perform providing rewards to the first user for associating the first digital identity with the new digital identity, the rewards including social and/or monetary incentives for associating the first digital identity with the new digital identity.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The accompanying drawings, which are included to provide further understanding and are incorporated in and constitute a part of this specification, illustrate aspects of the subject technology, and together with the description serve to explain the principles of the subject technology. In the drawings.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

The detailed description set forth below is intended as a description of various implementations and is not intended to represent the only implementations in which the subject technology may be practiced. As those skilled in the art would realize, the described implementations may be modified in various different ways, all without departing from the scope of the present disclosure. Accordingly, the drawings and description are to be regarded as illustrative in nature and not restrictive.

General Overview

Social media platforms are useful for connecting people together and distributing information. By leveraging connections between people, posts may be seen by a wide range of individuals throughout the world. One way that posts achieve influence is through positive community feedback, such as through upvotes, comments, likes, etc. Although a user who creates content may receive personal acclaim and recognition through receiving positive feedback, those users who provide the positive feedback oftentimes receive only limited exposure. Therefore, there is a need to incentivize providing positive feedback in social media platforms.

According to an aspect of the present disclosure, users may bid on posts created by authors on a social media platform. The posts may be original works by the author, and may include information in the form of text, photos, videos, links, and other rich content. The posts may be verified for authenticity through a blockchain to ensure the content is indeed the work of the author. Users may bid on the posts with tokens distributed through the social media platform. The highest bidder may have their profiles displayed in a prominent position in relation to the post. By being displayed in the prominent position, the highest bidder may be able to advertise their own interests, in addition to showing appreciation and placing value on the author's post. The author, a previous highest bidder, and an administrator may share in the tokens that were utilized for bidding. The tokens may also be utilized for other features through the social media platform.

The disclosed system addresses a problem in traditional social media systems, namely the technical problem of incentivizing feedback on posts. As described above, conventional social media feedback techniques do not provide incentives for feedback from users. The disclosed system solves this technical problem by providing a solution also rooted in computer technology, namely, by providing for bidding on social media posts.

The disclosed subject technology further provides improvements to the functioning of the computer itself because it improves verification of posts by storing posts on a blockchain. Specifically, posts are authenticated as original works and may be bid on by other users to upvote the post. This overcomes shortcomings associated with current solutions, which do not provide bidding incentives and do not validate authenticity of posts.

As used herein, the term "blockchain" refers generally to an open and distributed public ledger comprising a growing list of records, which are linked using cryptography. By design, the blockchain is resistant to modification of the data. The blockchain can include an auditable database that provides a distributed, replicated ledger of cryptographically certified artifacts whose contents are extremely difficult to tamper with without detection, and therefore, are with very high probability, true copies of the intended content, and whose content are open for inspection via a suitable query interface.

As used herein, the term "block" generally refers to a record that is kept in a blockchain. For example, each block contains a cryptographic hash of the previous block, a timestamp, and transaction data, which can generally be represented as a merkle tree root hash.

As used herein, the term "token" generally refers to virtual currency tokens that may reside on their own blockchains and may represent an asset or utility. For example, a token may represent customer loyalty points on a blockchain that is used to manage details for a retailer. Another token may allow a holder to view 10 hours of streaming content on a video-sharing blockchain. Another token may represent a cryptocurrency, such as Bitcoin. Tokens may be tradable and transferrable among the various participants of the blockchain. Tokens may also serve as transaction units on blockchains that are created using standard templates, like that of the Ethereum network, which allows a user to create his/her own tokens. Such blockchains work on the concept of smart contracts or decentralized applications, where programmable, self-executing code is used to process and manage the various transactions occurring on the blockchain. Tokens may be exchanged for other tokens and/or liquid currencies (e.g., US dollars) through currency exchanges.

Example System Architecture

Figure 1:
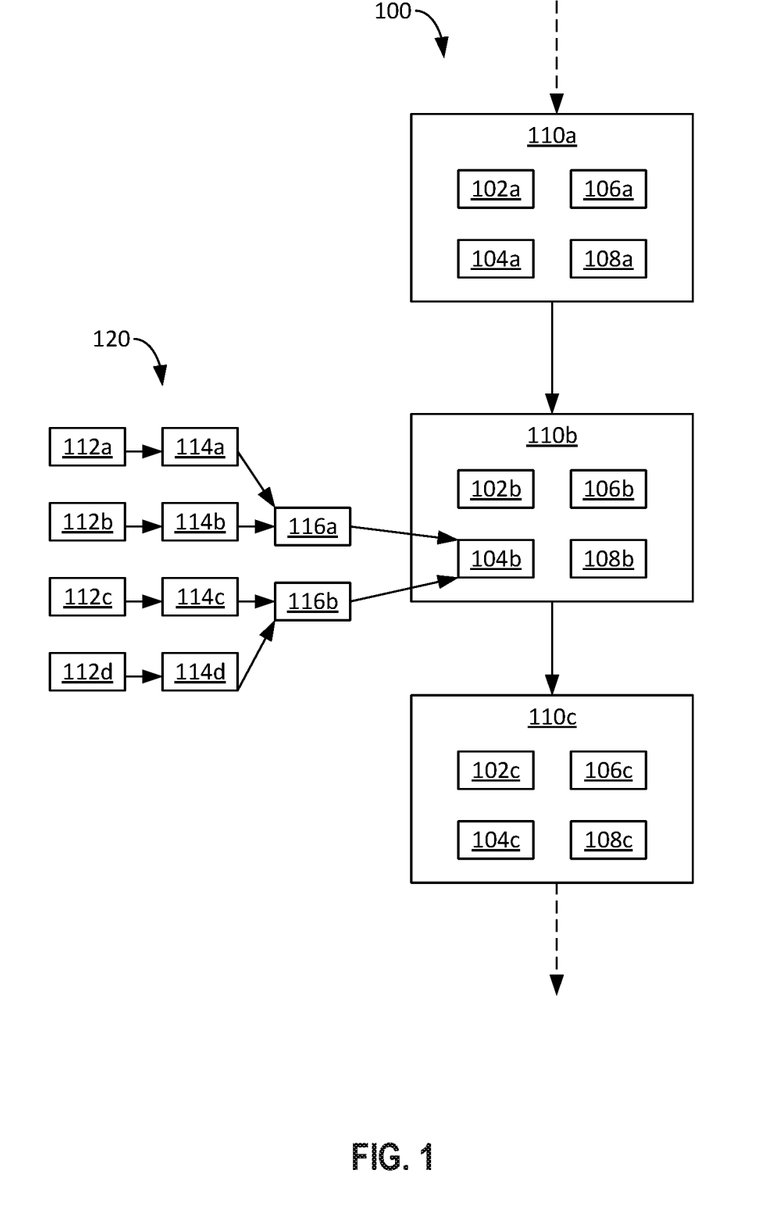
FIG. 1 illustrates an example blockchain system for practicing some implementations of the disclosure.

FIG. 1 illustrates a blockchain system 100 that can be utilized for creating and verifying a digital identity. As shown, the blockchain system 100 includes several blocks 110. For simplicity, three blocks 110 are shown. Each block 110 includes a previous hash 102, a transaction root 104, a timestamp 106, and a nonce 108.

The previous hash 102 is the value obtained by hashing a previous block 110 in the blockchain system 100. For example, if block 110b is the Nth block in the blockchain system 100, then the previous hash 102b is the value of the hash of block N−1, which in this case would be block 110a. Similarly, the previous hash 102c is the value of the hash of block 110b.

The transaction root 104 is the root hash value of a hash tree 120 (e.g., a merkle tree) over all transactions to be added to the block 110. For example, transactions 112a, 112b, 112c, and 112d are to be added to block 110b. According to an aspect of the present disclosure, transactions 112a-112d may be any type of transaction, and may include any type of data of any length such as photographs, videos, sound recordings, etc. In order to add transactions 112a-112d to the blockchain system 100, each transaction 112a-112d is hashed to obtain hashed transactions 114a, 114b, 114c, and 114d. For example, hashing transaction 112a yields hashed transaction 114a, hashing transaction 112b yields hashed transaction 114b, and so on.

The hashed transactions 114a-114d are then hashed with each other to obtain hashes 116a and 116b. For example, hashed transaction 114a is hashed with hashed transaction 114b to obtain hash 116a, and hashed transaction 114c is hashed with hashed transaction 114d to obtain hash 116b. Finally, hash 116a is hashed with hash 116b to obtain the transaction root 104b. It will be appreciated that although the hash tree 120 for block 110b is shown, it is understood that all transaction roots 104 of all blocks 110 in the blockchain system 100 include a corresponding hash tree 120. As a result, each block 110 added to the blockchain system 100 is a confirmation of all the transactions that occurred before, making the blockchain system 100 effectively permanent and immutable. This is because it would be computationally impractical/impossible to modify the blocks 110 of the blockchain system 100 by any bad actors.

According to an aspect of the present disclosure, hashing can be accomplished using cryptographic hash functions such as, including, but not limited to, Secure Hash Algorithm (SHA) 0, SHA-1, SHA-2, SHA-3, . . . , SHA-256, etc., or Digital Signature Hash Algorithm (DSA).

In operation, rewards may be issued to users who add blocks 110 to the blockchain system 100. The rewards may include monetary fees or other incentives that may be spent either within or outside of the blockchain system 100. In order to maintain fairness of reward distribution and to ensure the integrity of the blockchain system 100, users must compete with each other to add each block 110. For example, users competing to add block 110b to the blockchain system 100 must include a proof-of-work to be considered valid. This proof-of-work is tied to the nonce 108 and is verified by other users (e.g., nodes) each time a block 110 is added. According to an aspect of the present disclosure, the nonce 108 is a 32-bit field whose value may be adjusted to either speed up or slow down the addition of new blocks 110. Although a proof-of-work system has been described, it is understood that the implementations also apply to other types of systems regardless of distributed consensus protocol, including but not limited to, distributed proof-of-stake.

According to an aspect of the present disclosure, the blockchain system 100 can include publicly distributed block headers, which is a technology known to meet the requirements of storing replicated artifacts in publicly available distributed storage facilities that cannot be tampered with, and that are readily available for inspection. According to an aspect, the blockchain system 100 is a public blockchain.

Example System for Bidding on Posts

Figure 2:
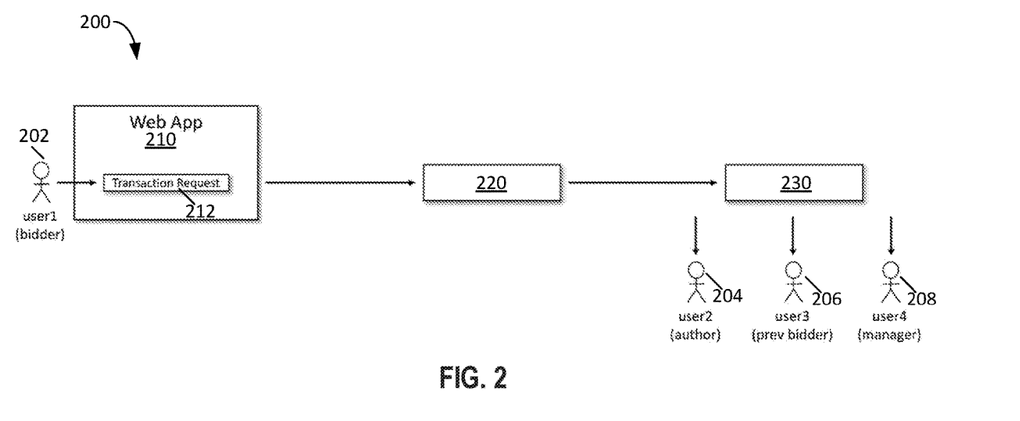
FIG. 2 illustrates an example system for bidding on a post, according to certain aspects of the disclosure.

FIG. 2 illustrates an example system 200 for bidding on a post 220 on a social media platform, according to certain aspects of the disclosure. The system 200 may include a web application 210 where a user 202 (e.g., a bidder) may bid on a post 220 that was created by an author 204. For example, the user 202 may bid on the post 220 with credits 230 issued through a social media platform. The credits 230 may be tokens.

According to an aspect, the user 202 may bid on the post 220 by issuing a transaction request 212 through the web application 210. The credits 230 utilized for bidding may be distributed to the author 204, a previous bidder 206, and an administrator 208. It is understood that any user may be considered an author, so long as they create and post content.

In an implementation, once users register to become members of the social media platform, they start gaining an income. The income may include daily credits 230 issued as tokens, such as digital tokens, digital assets, or blockchain tokens. For example, each user may receive a lifetime bond of credits 230 allocated to them, which the users can draw from on a daily basis. As described above, the credits 230 may be utilized to bid on (e.g., upvote) a post 220. The credits 230 may be accumulated for other useful purposes on the social media platform, and thus provide incentive for users to be involved in the bidding process.

According to aspects, each user is able to have their own profiles, where they can provide a link to content that they would want to be included when they make their bids. For example, when the user 202 bids on the post 220, the user 202 may associate content with the bid. The content may include a link to an advertising page that advertises something about the user 202. As the user's bid escalates up to the top of a list of comments that are made on the post 220, so does the content of the user 202.

According to an aspect, a bidding process may include a first bid by a first bidder (e.g., user 206). The first bidder may bid an initial bid amount (e.g., one credit or one token). A second bidder (e.g., user 202) may outbid the first bidder by bidding an increment amount over the initial bid amount. For example, the increment amount may be 20% of the initial bid amount. If the initial bid was 1 credit, then the second bid will be 1.2 credits. Once the first bidder has been outbid by the second bidder, then the first bidder will be refunded their 1 credit, and the additional 0.2 credits will be divided between the first bidder, the author 204, and the administrator 208. It is understood that the increment amount of 20% is exemplary only, and other increment amounts are permitted. The increment amount may be determined by the administrator 208. It is further understood that bids may be fixed or adjustable, such that users may either determine their own bid amounts, or the bids may be predetermined by the administrator 208.

As bids go higher, more profits may be realized by the author 204, the bidders who get outbid, and the administrator 208. It is understood that the credits distributed may be weighted to be in favor of the author 204 and then the previous high bidder, with the administrator 208 taking only a modest commission. In this way, bidding on posts is encouraged and is also fun. Users are also incentivized to bid enough to take over a top position so that their content may be viewable. For example, the author 204 may be a renowned automobile critic, and creates the post 220 about a car review. The user 202 may be someone who works at, or has interest in, an automobile manufacturing company. By bidding to take over the top spot, the user 202 may link advertising content to the automobile manufacturing company, which will be visible to anyone who sees the author's post 220.

In an implementation, each user may be given a lifetime bond of 100,000 tokens (e.g., digital tokens), with 10 tokens issued per day. This would come out to about 27 years' worth of daily tokens. It is understood that the lifetime bond amount may be increased after 27 years have passed, or for other reasons, as necessary to keep giving tokens to the user. It is further understood that the lifetime bond of tokens is exemplary only, and other amounts are possible. In an aspect, if the user fails to claim the daily tokens in a timely manner, then those tokens may be forfeited. In an aspect, each user may be issued a bonus amount of tokens (e.g., 500 digital tokens) for signing up for the social media platform. It is understood that various allocation methods in addition to those described herein can be utilized to issue tokens to users.

According to aspects, the user-created content (e.g., post 220) may be registered through a blockchain in order to certify that what gets posted is in fact what the user created. In this way, the social medial platform may guarantee that the content rendered is actually created by the user and not a forged or otherwise hijacked copy of someone else's work. For example, when the author 204 creates the post 220, the content of the post (e.g., text, pictures, media, links, etc.) is utilized to generate a hash value. The hash value, along with account information of the author 204 (e.g., account name, post number, etc.) is stored on the blockchain. The content of the post 220 may be stored on a separate server. In an implementation, in order for the content to be rendered as the post 220, a hash value of the content stored on the separate server must match the hash value of the content stored on the blockchain. If the hash values do not match, then that means there is evidence of tampering, and the content is not posted. Of course, this does not prevent authors from making updates, revisions, or otherwise change their content.

Accounting logic, token issuance, token transfers, and token management may all be stored on the blockchain, and may be managed through smart contracts on the blockchain. For example, when the user 202 bids on the content (e.g., post 220), an action is issued to the blockchain to perform a bid, and the smart contract on the blockchain will certify the user 202 and the bid, or any other action that may be taken through a Ricardian contract. The blockchain may also manage the math associated with distributing the tokens, validate that account balances have sufficient funds for bidding, etc. These may all be recorded on the blockchain independent of any other institution having to be involved. Because the blockchain is decentralized and public, anyone may view and audit the log entries.

The smart contracts may be programs that are run on a virtual machine in a virtual environment that is constructed by the blockchain. For example, the smart contracts may be written as programs that are loaded onto the blockchain. As people make action requests against the smart contracts, the smart contracts get executed and complete the requested actions, so long as predefined conditions are met.

According to an aspect, account creation may be completed through a smart contract by running an open account action against the blockchain. For example, a message for opening an account may be sent to an API endpoint on the blockchain. The message may include a name of a user, the user's authorization, etc. The smart contract may then issue a request for a certain amount of tokens to be issued for the lifetime bond of that user and create an entry in its database or in its table for that user. The smart contract may also note that the user has X amount of tokens in the lifetime bond, and make an initial issuance or initial transfer of tokens from that lifetime bond to the user's token account so that the user can immediately start spending it. Everything then gets saved, the open account action is finished, and a transaction entry is stored in the history of the blockchain, which may then be utilized to build further blocks in the blockchain.

When a user (e.g., author 204) desires to post content, the user may utilize an external web application (e.g., web application 210) to create their post. When the user submits the post, the web application may formulate a signed request by the user and send the signed request to the blockchain. For example, the request may contain a hash of the text, along with a few other entries, which toggles a post action on the smart contract. The post action may include validation of the user (e.g., the user does not have any penalties or restrictions against them at this moment) before posting the content. After the content is posted, the smart contract logs the fact that the user created a post and the blockchain moves on to the action.

When a user (e.g., user 202) desires to bid on a post through the web application, the user may formulate all the parameters they need to bid, such as a bid amount, for submission as a bid. The user may then approve a Ricardian contract that confirms the user wishes to submit the bid, and the smart contract may then formulate a signed request to send to the blockchain, which indicates that user Y wants to bid X amount on author's post number Z, and few other parameters, and sends that request to the end point on the blockchain. The blockchain executes that command by accessing tables about that user to get information from their account to make sure that the user has enough information or enough resources to do the bidding, allocates the funds, and distributes those to the other participant. A ledger entry is then created that goes into the blockchain history, and a few of the tables are updated accordingly with new values.

According to additional aspects, users may self-police the content of posts. For example, if a user posts inflammatory and/or illegal material, other users may report that user. Once flagged, it may be determined that a penalty should be leveraged against the offending user. For example, the penalty may be a fine in a certain amount of tokens, a time-out period prohibiting posts, etc. In an implementation, a moderator (e.g., the administrator 208) may review the offending content to affirm whether it is in bad taste, how offensive it is, and assign a penalty in line with the offense. Depending on the degree of offense, a fine for a certain amount may be levied against the offending user, which may be paid directly or garnished over a period of time until the fine is paid. The offending user may also be put in a time-out, which effectively restricts their ability to post or bid until the sentence is completed.

Figure 3:
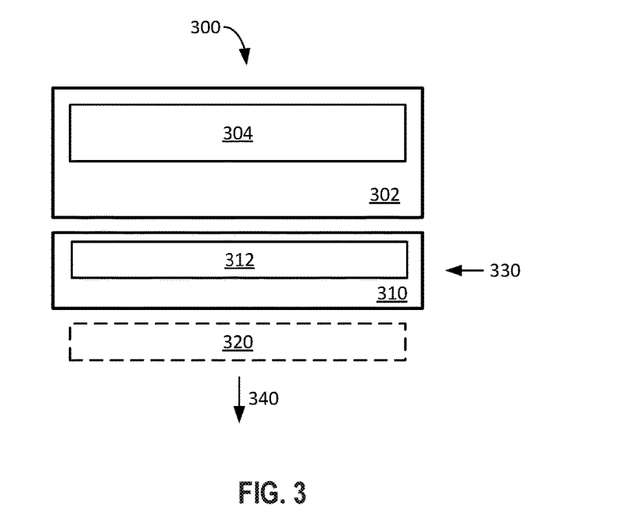
FIG. 3 illustrates an example screen capture of a post and bids on the post, according to certain aspects of the disclosure.

FIG. 3 illustrates an example screen capture 300 of a post 302 and bids on the post 302, according to certain aspects of the disclosure. The post 302 may include content 304 created by an author. A first bid 310 (e.g., a highest bidder) may occupy a top position 330 that is immediately below the post 302. For example, the first bid 310 may include promotional content 312. The promotional content 312 may only be displayed when the first bid 310 is in the top position 330. The promotional content 312 may include links, advertisements, etc.

A second bid 320 may occupy a position below the first bid 310. As shown, the second bid 320 currently does not display any promotional content, even though the second bid 320 may include promotional content. If the second bid 320 out bids the first bid 310, then the second bid 320 may occupy the top position 330 to display the promotional content. The previous top bidder then would occupy a position below the top position 330. It is possible that the previous top bidder falls farther below the top position to a third place or lower position 340 based on bids from other users outbidding the previous top bidder.

According to an aspect, only bids in the top position are displayed. For example, the second bid 320 is shown in dotted lines to indicate that it is optional whether to display the second bid 320.

It is understood that although two bids are shown, additional bids may be shown below the second bid 320. According to aspects, a predetermined number of bids may be displayed below the post 302, with only the bid in the top position 330 displaying promotional content.

The techniques described herein may be implemented as method(s) that are performed by physical computing device(s), as one or more non-transitory computer-readable storage media storing instructions (e.g., stored sequences of instructions) which, when executed by computing device(s), cause performance of the method(s), or, as physical computing device(s) that are specially configured with a combination of hardware and software that causes performance of the method(s).

Figure 4:
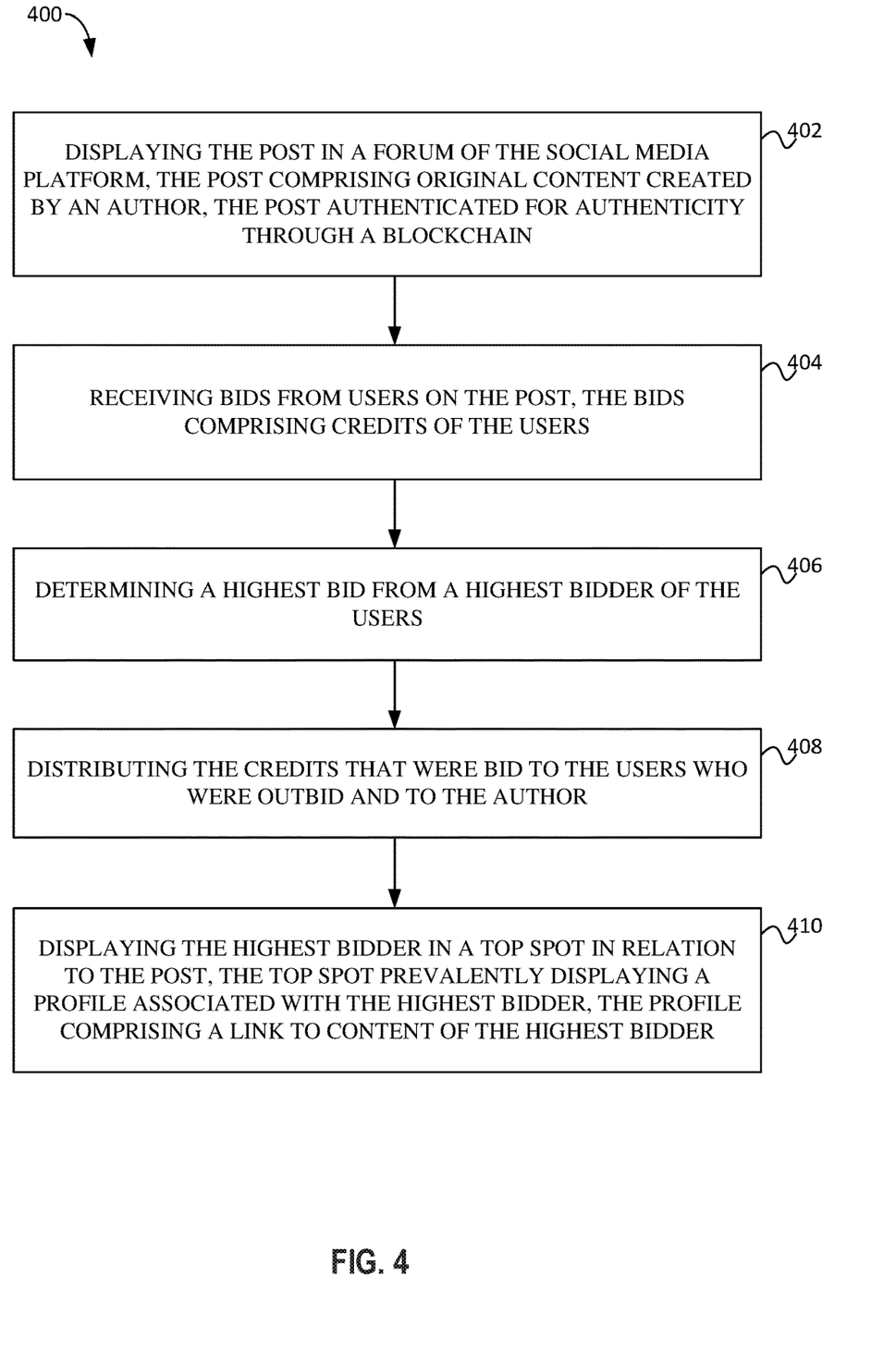
FIG. 4 illustrates an example flow diagram for bidding on a post, according to certain aspects of the disclosure.

FIG. 4 illustrates an example process flow diagram 400 for a computer-implemented method for bidding on a post, according to certain aspects of the disclosure. For explanatory purposes, the example process 400 is described herein with reference to the blockchain system 100 of FIG. 1, the bidding system 200 of FIG. 2, and the screen capture 300 of FIG. 3. Further for explanatory purposes, the blocks of the example process 400 are described herein as occurring in serial, or linearly. However, multiple blocks of the example process 400 may occur in parallel. In addition, the blocks of the example process 400 need not be performed in the order shown and/or one or more of the blocks of the example process 400 need not be performed. For purposes of explanation of the subject technology, the process 400 will be discussed in reference to FIGS. 1-3.

At block 402, post is displayed in a public forum of a social media platform. The post may include original content created by an author. The post may be authenticated for authenticity through a blockchain. For example, as shown in FIG. 2, an author 204 may submit a post 220 through the social media platform. The post 220 may be validated for authenticity through the blockchain.

At block 404, bids are received from users on the post. For example, as shown in FIG. 2, a user 202 may bid on the post 220. The bids may include credits 230 of the users. At block 406, a highest bid is determined from a highest bidder of the users. For example, the user 202 may outbid a previous user 206, as shown in FIG. 2. At block 408, the credits that were bid are distributed to the users who were outbid and to the author. For example, as described above in relation to FIG. 2, the credit 230 may be distributed to the previous bidder 206, the author 204, and an administrator 208. The credit 230 may also be distributed to other possible recipients. For example, the number and type of recipients can be varied without changing the essence of the described process 400.

At block 410, the highest bidder is displayed in a top spot in relation to the post. The top spot may prevalently display a profile associated with the highest bidder. The profile may include a link to content of the highest bidder. For example, as shown in FIG. 3, the top spot 330 may be directly below the post 302. The highest bidder (e.g., first bid 310) may include promotional content 312, such as a user profile, a link, advertisements, etc.

According to an aspect of the present disclosure, the process 400 includes generating a first hash value associated with an original work of the author, the first hash value based on content of the original work. The process 400 further includes storing the first hash value on the blockchain. The process 400 further includes storing the original work on a server. The process 400 further includes generating a second hash value for the original work stored on the server. The process 400 further includes authenticating the original work to be displayed as the post when the first hash value matches the second hash value.

According to an aspect of the present disclosure, the process 400 includes receiving a first bid on the post from a first bidder, the first bid comprising a predetermined initial bid amount of credits. The process 400 further includes receiving a second bid on the post from a second bidder, the second bid comprising a predetermined increment amount. In an implementation, the predetermined increment amount is determined by an administrator. For example, the predetermined increment amount may be 10% of each preceding bid. In an aspect, a user may specify an amount greater than a minimum predetermined increment.

According to an aspect of the present disclosure, the process 400 includes distributing the credits to the users as tokens. The process 400 further includes allotting a predetermined amount of tokens to each user (e.g., as a bond) upon joining the social media platform. The process 400 further includes distributing a predetermined amount of tokens to each user per day.

In an implementation, an author (e.g., author 204) creates and publishes a post (e.g., post 302) on a social media platform. For example, at step 402, the post is displayed in a public forum of a social media platform. The post may be about any subject (e.g., content 304) that the author has an interest in publishing, such as a hobby, an opinion, a technical matter, etc. The post may be verified through a blockchain prior to being published.

A first bidder (e.g., user 206) may bid on the post. For example, at step 404, bids are received from users on the post. The first bidder may post a first bid amount (e.g., bid 310), which may be predetermined by an administrator (e.g., administrator 208). The first bidder may initially occupy a top position (e.g., top position 330) directly below the post of the author. Because the first bidder is in the top position, the first bidder may have promotional content displayed (e.g., promotional content 312). For example, the promotional content may relate to the content of the post and/or any promotional material that the first bidder desires to promote (e.g., user profile, a link, advertisements, etc.).

A second bidder (e.g., user 202) may outbid the first bidder. The second bidder may bid a predetermined increment amount above the first bid. For example, the bid increment may be determined by the administrator (e.g., at 10%, 20%, etc.). The bid increment may also be customizable by the users. For example, a user may specify an amount greater than a minimum predetermined increment. At step 406, a highest bid is determined from a highest bidder of the users. The bids may include credits (e.g., credits 230) of the users. At step 408, the credits that were bid are distributed to the users who were outbid and to the author. For example, credits may be distributed to the first bidder, the author, and the administrator (e.g., as a commission). The commission distributed to the administrator may be a predetermined percentage of the bid amount. The credits may also be distributed to other recipients in addition to, and/or in lieu of, the users who were outbid and the author. For example, the number and type of recipients can be varied without changing the essence of the described process.

Because the second bidder has outbid the first bidder, the second bidder now occupies the top position. For example, at step 410, the highest bidder is displayed in a top spot in relation to the post. The top spot may now prevalently display a profile associated with the second bidder (e.g., the highest bidder). The process of bidding may continue until users stop bidding, at which time a final highest bidder will occupy the top position with a final highest bid amount.

According to aspects, the above-described bidding process may take place on a continuous basis with new high bidders being established regularly, with each successively having the top display spot in relation to the post. As a result, subsequent auctions would occur to replace the current high bidder. According to aspects, the current highest bidder may display a comment as part of winning the top display spot. In an implementation, the current highest bidder's comment is recorded on the blockchain and associated with the original post.

According to aspects, the initial bid price and subsequent bid increments may be set by the bidders. According to further aspects, the initial bid price and subsequent bid increments may be administratively set (e.g., by an administrator). According to aspects, the initial bid price and subsequent bid increments may be set by an administrator. According to further aspects, the initial bid price and subsequent bid increments may be set by the bidders. It is understood that these are exemplary only, and the bid increments may be set in other ways as well.

Hardware Overview

Figure 5:
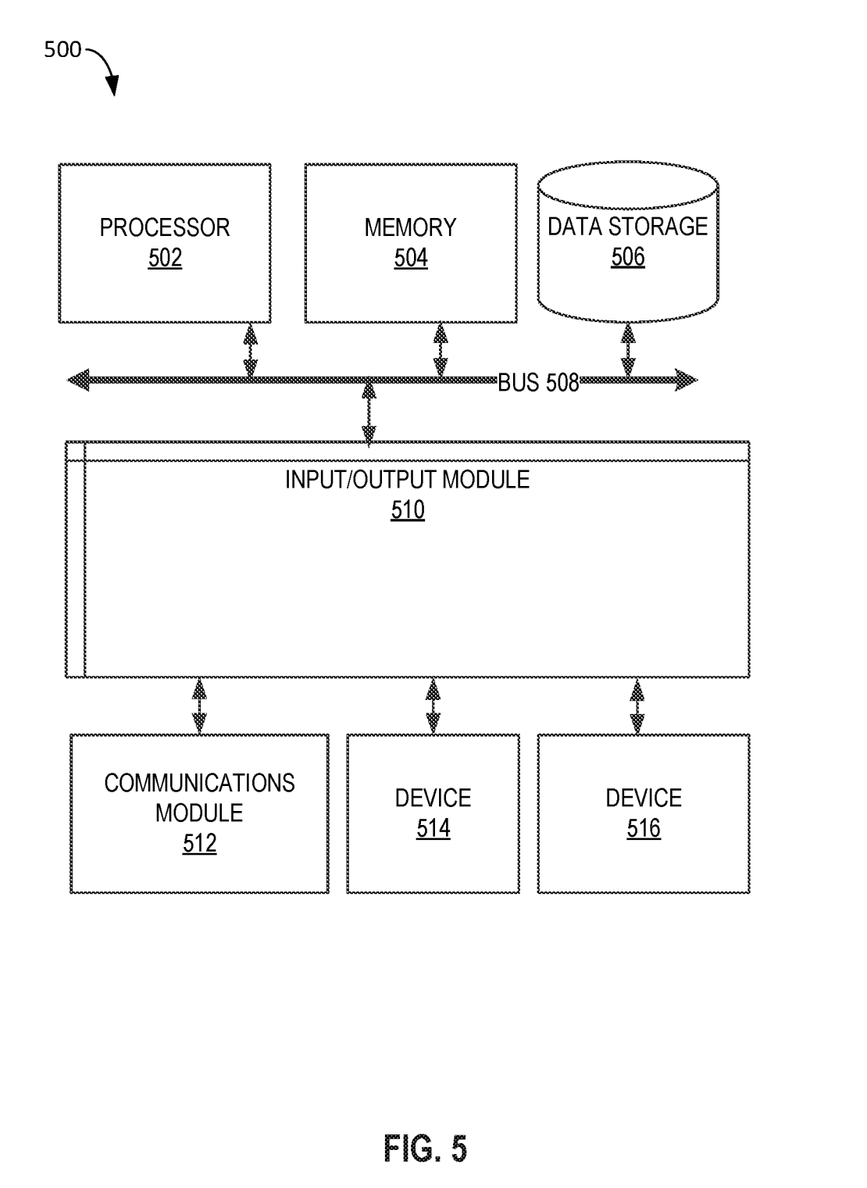
FIG. 5 is a block diagram illustrating an example computer system with which aspects of the subject technology can be implemented.

FIG. 5 is a block diagram illustrating an example computer system 500 with which the blockchain system 100 of FIG. 1, the bidding system 200 of FIG. 2, and the screen capture 300 of FIG. 3 may be implemented. In certain aspects, the computer system 500 may be implemented using hardware or a combination of software and hardware, either in a dedicated server, or integrated into another entity, or distributed across multiple entities.

Computer system 500 (e.g., blockchain system 100, bidding system 200, and screen capture 300) includes a bus 508 or other communication mechanism for communicating information, and a processor 502 coupled with bus 508 for processing information. According to one aspect, the computer system 500 can be a cloud-computing server of an IaaS that is able to support PaaS and SaaS services. According to one aspect, the computer system 500 is implemented as one or more special-purpose computing devices. The special-purpose computing device may be hard-wired to perform the disclosed techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices, or any other device that incorporates hard-wired and/or program logic to implement the techniques. By way of example, the computer system 500 may be implemented with one or more processors 502. Processor 502 may be a general-purpose microprocessor, a microcontroller, a Digital Signal Processor (DSP), an ASIC, an FPGA, a Programmable Logic Device (PLD), a controller, a state machine, gated logic, discrete hardware components, or any other suitable entity that can perform calculations or other manipulations of information.

Computer system 500 can include, in addition to hardware, code that creates an execution environment for the computer program in question, e.g., code that constitutes processor firmware, a protocol stack, a database management system, an operating system, or a combination of one or more of them stored in an included memory 504, such as a Random Access Memory (RAM), a flash memory, a Read-Only Memory (ROM), a Programmable Read-Only Memory (PROM), an Erasable PROM (EPROM), registers, a hard disk, a removable disk, a CD-ROM, a DVD, or any other suitable storage device, coupled to bus 508 for storing information and instructions to be executed by processor 502. The processor 502 and the memory 504 can be supplemented by, or incorporated in, special purpose logic circuitry. Expansion memory may also be provided and connected to computer system 500 through input/output module 510, which may include, for example, a SIMM (Single In Line Memory Module) card interface. Such expansion memory may provide extra storage space for computer system 500, or may also store applications or other information for computer system 500. Specifically, expansion memory may include instructions to carry out or supplement the processes described above, and may include secure information also. Thus, for example, expansion memory may be provided as a security module for computer system 500, and may be programmed with instructions that permit secure use of computer system 500. In addition, secure applications may be provided via the SIMM cards, along with additional information, such as placing identifying information on the SIMM card in a non-hackable manner.

The instructions may be stored in the memory 504 and implemented in one or more computer program products, e.g., one or more modules of computer program instructions, encoded on a computer-readable medium for execution by, or to control the operation of, the computer system 500, and according to any method well known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, embeddable languages, and xml-based languages. Memory 504 may also be used for storing temporary variable or other intermediate information during execution of instructions to be executed by processor 502.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network, such as in a cloud-computing environment. The processes and logic flows described in this specification can be performed by one or more programmable processors executing one or more computer programs to perform functions by operating on input data and generating output.

Computer system 500 further includes a data storage device 506 such as a magnetic disk or optical disk, coupled to bus 508 for storing information and instructions. Computer system 500 may be coupled via input/output module 510 to various devices. The input/output module 510 can be any input/output module. Example input/output modules 510 include data ports such as USB ports. In addition, input/output module 510 may be provided in communication with processor 502, so as to enable near area communication of computer system 500 with other devices. The input/output module 510 may provide, for example, wired communication in some implementations, or wireless communication in other implementations, and multiple interfaces may also be used. The input/output module 510 is configured to connect to a communications module 512. Example communications modules 512 include networking interface cards, such as Ethernet cards and modems.

The components of the system can be interconnected by any form or medium of digital data communication (e.g., a communication network). The communication network can include, for example, any one or more of a personal area network (PAN), a local area network (LAN), a campus area network (CAN), a metropolitan area network (MAN), a wide area network (WAN), a broadband network (BBN), the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

For example, in certain aspects, communications module 512 can provide a two-way data communication coupling to a network link that is connected to a local network. Wireless links and wireless communication may also be implemented. Wireless communication may be provided under various modes or protocols, such as GSM (Global System for Mobile Communications), Short Message Service (SMS), Enhanced Messaging Service (EMS), or Multimedia Messaging Service (MMS) messaging, CDMA (Code Division Multiple Access), Time Division Multiple Access (TDMA), Personal Digital Cellular (PDC), Wideband CDMA, General Packet Radio Service (GPRS), or LTE (Long-Term Evolution), among others. Such communication may occur, for example, through a radio-frequency transceiver. In addition, short-range communication may occur, such as using a BLUETOOTH, WI-FI, or other such transceiver.

In any such implementation, communications module 512 sends and receives electrical, electromagnetic, or optical signals that carry digital data streams representing various types of information. The network link typically provides data communication through one or more networks to other data devices. For example, the network link of the communications module 512 may provide a connection through local network to a host computer or to data equipment operated by an Internet Service Provider (ISP). The ISP in turn provides data communication services through the world wide packet data communication network now commonly referred to as the "Internet." The local network and Internet both use electrical, electromagnetic, or optical signals that carry digital data streams. The signals through the various networks and the signals on the network link and through communications module 512, which carry the digital data to and from computer system 500, are example forms of transmission media.

Computer system 500 can send messages and receive data, including program code, through the network(s), the network link, and communications module 512. In the Internet example, a server might transmit a requested code for an application program through the Internet, the ISP, the local network, and communications module 512. The received code may be executed by processor 502 as it is received, and/or stored in data storage 506 for later execution.

In certain aspects, the input/output module 510 is configured to connect to a plurality of devices, such as an input device 514 and/or an output device 516. Example input devices 514 include a keyboard and a pointing device, e.g., a mouse or a trackball, by which a user can provide input to the computer system 500. Other kinds of input devices 514 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback, and input from the user can be received in any form, including acoustic, speech, tactile, or brain wave input. Example output devices 516 include display devices, such as an LED (light emitting diode), CRT (cathode ray tube), LCD (liquid crystal display) screen, a TFT LCD (Thin-Film-Transistor Liquid Crystal Display), or an OLED (Organic Light Emitting Diode) display, for displaying information to the user. The output device 516 may comprise appropriate circuitry for driving the output device 516 to present graphical and other information to a user.

According to one aspect of the present disclosure, the blockchain system 100, the bidding system 200, and screen capture 300 can be implemented using a computer system 500 in response to processor 502 executing one or more sequences of one or more instructions contained in memory 504. Such instructions may be read into memory 504 from another machine-readable medium, such as data storage device 506. Execution of the sequences of instructions contained in main memory 504 causes processor 502 to perform the process steps described herein. One or more processors in a multi-processing arrangement may also be employed to execute the sequences of instructions contained in memory 504. Processor 502 may process the executable instructions and/or data structures by remotely accessing the computer program product, for example by downloading the executable instructions and/or data structures from a remote server through communications module 512 (e.g., as in a cloud-computing environment). In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. For example, some aspects of the subject matter described in this specification may be performed on a cloud-computing environment. Accordingly, in certain aspects, a user of systems and methods as disclosed herein may perform at least some of the steps by accessing a cloud server through a network connection. Further, data files, circuit diagrams, performance specifications, and the like resulting from the disclosure may be stored in a database server in the cloud-computing environment, or may be downloaded to a private storage device from the cloud-computing environment.

Computing system 500 can include clients and servers. A client and server are generally remote from each other and typically interact through a communication network. The relationship of client and server arises by virtue of computer programs running on the respective computers and having a client-server relationship to each other. Computer system 500 can be, for example, and without limitation, a desktop computer, laptop computer, or tablet computer. Computer system 500 can also be embedded in another device, for example, and without limitation, a mobile telephone, a personal digital assistant (PDA), a mobile audio player, a Global Positioning System (GPS) receiver, and/or a television set top box.

The term "machine-readable storage medium" or "computer-readable medium" as used herein refers to any medium or media that is provided including instructions or data to processor 502 for execution. The term "storage medium" as used herein refers to any non-transitory computer-readable storage medium that stores data and/or instructions that cause a machine to operate in a specific fashion. Such a medium may take many forms, including, but not limited to, non-volatile media, volatile media, and transmission media. Non-volatile media include, for example, optical disks, magnetic disks, or flash memory, such as data storage device 506. Volatile media include dynamic memory, such as memory 504. Transmission media include coaxial cables, copper wire, and fiber optics, including the wires that comprise bus 508. Common forms of machine-readable media include, for example, a floppy disk, a flexible disk, a hard disk, magnetic tape, any other magnetic medium, a CD-ROM, a DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

As used in this specification of this application, the terms "computer-readable storage medium" and "computer-readable media" are entirely restricted to tangible, physical objects that store information in a form that is readable by a computer. These terms exclude any wireless signals, wired download signals, and any other ephemeral signals. Storage media is distinct from but may be used in conjunction with transmission media. Transmission media participates in transferring information between storage media. For example, transmission media includes coaxial cables, copper wire, and fiber optics, including the wires that comprise bus 508. Transmission media can also take the form of acoustic or light waves, such as those generated during radio-wave and infra-red data communications. Furthermore, as used in this specification of this application, the terms "computer," "server," "processor," and "memory" all refer to electronic or other technological devices. These terms exclude people or groups of people. For the purposes of the specification, the terms display or displaying means displaying on an electronic device.

In one aspect, a method may be an operation, an instruction, or a function and vice versa. In one aspect, a clause or a claim may be amended to include some or all of the words (e.g., instructions, operations, functions, or components) recited in other one or more clauses, one or more words, one or more sentences, one or more phrases, one or more paragraphs, and/or one or more claims.

To illustrate the interchangeability of hardware and software, items such as the various illustrative blocks, modules, components, methods, operations, instructions, and algorithms have been described generally in terms of their functionality. Whether such functionality is implemented as hardware, software, or a combination of hardware and software depends upon the particular application and design constraints imposed on the overall system. Skilled artisans may implement the described functionality in varying ways for each particular application.

The word "exemplary" is used herein to mean "serving as an example, instance, or illustration." Any embodiment described herein as "exemplary" is not necessarily to be construed as preferred or advantageous over other embodiments. Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A reference to an element in the singular is not intended to mean "one and only one" unless specifically stated, but rather "one or more." Pronouns in the masculine (e.g., his) include the feminine and neuter gender (e.g., her and its) and vice versa. The term "some" refers to one or more. Underlined and/or italicized headings and subheadings are used for convenience only, do not limit the subject technology, and are not referred to in connection with the interpretation of the description of the subject technology. Relational terms such as first, second, and the like may be used to distinguish one entity or action from another without necessarily requiring or implying any actual such relationship or order between such entities or actions. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public, regardless of whether such disclosure is explicitly recited in the above description. No claim element is to be construed under the provisions of 35 U.S.C. § 112, sixth paragraph, unless the element is expressly recited using the phrase "means for" or, in the case of a method claim, the element is recited using the phrase "step for."

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately, or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed, to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products.

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter.

The claims are not intended to be limited to the aspects described herein, but are to be accorded the full scope consistent with the language claims and to encompass all legal equivalents. Notwithstanding, none of the claims are intended to embrace subject matter that fails to satisfy the requirements of the applicable patent law, nor should they be interpreted in such a way.

What is claimed is:

1. A computer-implemented method for bidding on a post in a social media platform, comprising:
    storing a first hash value of original content on a blockchain, the original content stored on a server and associated with an author;
    storing a second hash value associated with the original content on the server;
    authenticating the post for authenticity using the blockchain, wherein the authenticating comprises determining whether the first hash value matches the second value;
    in response to determining that the first has value and the second hash value match, displaying the post in a public forum of the social media platform, the post comprising the original content;
    receiving bids from users on the post, the bids comprising credits of the users, the credits issued by the social media platform;
    determining a highest bid that is received from a highest bidder of the users;
    distributing the credits that were bid to users who were outbid and to the author; and
    displaying the highest bidder in a top spot in relation to the post, the top spot displaying a profile associated with the highest bidder, the profile comprising a link to content of the highest bidder.

2. The computer-implemented method of claim 1, wherein receiving bids further comprises:
    receiving a first bid on the post from a first bidder, the first bid comprising a predetermined initial bid amount of credits; and
    receiving a second bid on the post from a second bidder, the second bid comprising a predetermined increment amount.

3. The computer-implemented method of claim 2, wherein the predetermined increment amount is determined by an administrator.

4. The computer-implemented method of claim 1, further comprising distributing the credits to the users as digital tokens.

5. The computer-implemented method of claim 4, further comprising allotting a predetermined amount of digital tokens to each user upon joining the social media platform.

6. The computer-implemented method of claim 4, further comprising distributing a predetermined amount of digital tokens to each user per day.

7. A system for bidding on a post in a social media platform, comprising:
    a memory storing sequences of instructions; and
    a processor configured to execute the sequences of instructions which, when executed, causes the processor to perform:
    storing a first hash value of original content on a blockchain, the original content stored on a server and associated with an author;
    storing a second hash value associated with the original content on the server;
    authenticating the post for authenticity using the blockchain, wherein the authenticating comprises determining whether the first hash value matches the second value;
    in response to determining that the first has value and the second hash value match, displaying the post in a public forum of the social media platform, the post comprising the original content;
    receiving bids from users on the post, the bids comprising credits of the users, the credits issued by the social media platform;
    determining a highest bid that is received from a highest bidder of the users;
    distributing the credits that were bid to users who were outbid and to the author; and
    displaying the highest bidder in a top spot in relation to the post, the top spot displaying a profile associated with the highest bidder, the profile comprising a link to content of the highest bidder.

8. The system of claim 7, further comprising stored sequences of instructions, which when executed by the processor, cause the processor to perform:
    receiving a first bid on the post from a first bidder, the first bid comprising a predetermined initial bid amount of credits; and
    receiving a second bid on the post from a second bidder, the second bid comprising a predetermined increment amount.

9. The system of claim 8, wherein the predetermined increment amount is determined by an administrator.

10. The system of claim 7, further comprising stored sequences of instructions, which when executed by the processor, cause the processor to perform:
    distributing the credits to the users as digital tokens.

11. The system of claim 10, further comprising stored sequences of instructions, which when executed by the processor, cause the processor to perform:
    allotting a predetermined amount of digital tokens to each user upon joining the social media platform.

12. The system of claim 10, further comprising stored sequences of instructions, which when executed by the processor, cause the processor to perform:
    distributing a predetermined amount of digital tokens to each user per day.

13. A non-transitory computer-readable storage medium is provided including instructions that, when executed by a processor, cause the processor to perform a method for bidding on a post in a social media platform, the method comprising:

storing a first hash value of original content on a blockchain, the original content stored on a server and associated with an author;

storing a second hash value associated with the original content on the server;

authenticating the post for authenticity using the blockchain, wherein the authenticating comprises determining whether the first hash value matches the second value;

in response to determining that the first has value and the second hash value match, displaying the post in a public forum of the social media platform, the post comprising the original content;

receiving bids from users on the post, the bids comprising credits of the users, the credits issued by the social media platform;

determining a highest bid that is received from a highest bidder of the users;

distributing the credits that were bid to users who were outbid and to the author; and displaying the highest bidder in a top spot in relation to the post, the top spot displaying a profile associated with the highest bidder, the profile comprising a link to content of the highest bidder.

14. The non-transitory computer-readable storage medium of claim 13, wherein the method further comprises:
receiving a first bid on the post from a first bidder, the first bid comprising a predetermined initial bid amount of credits; and
receiving a second bid on the post from a second bidder, the second bid comprising a predetermined increment amount.

15. The non-transitory computer-readable storage medium of claim 14, wherein the method further comprises:
incrementing the predetermined increment amount by an amount determined by an administrator.

16. The non-transitory computer-readable storage medium of claim 13, wherein the method further comprises:
distributing the credits to the users as digital tokens.

17. The non-transitory computer-readable storage medium of claim 16, wherein the method further comprises:
allotting a predetermined amount of digital tokens to each user upon joining the social media platform.

* * * * *